United States Patent [19]

Böhm et al.

[11] Patent Number: 5,050,928
[45] Date of Patent: Sep. 24, 1991

[54] RIGID COVER FOR THE ROOF OF A VEHICLE

[75] Inventors: Horst Böhm, Frankfurt; Rainer Grimm, Wetzlar, both of Fed. Rep. of Germany

[73] Assignee: Rockwell-Golde G.m.b.H., Fed. Rep. of Germany

[21] Appl. No.: 475,553

[22] Filed: Feb. 6, 1990

Related U.S. Application Data

[62] Division of Ser. No. 269,854, Nov. 10, 1988, Pat. No. 4,925,237.

[30] Foreign Application Priority Data

Nov. 12, 1987 [DE] Fed. Rep. of Germany ....... 3738400
Aug. 26, 1988 [DE] Fed. Rep. of Germany ....... 3828963

[51] Int. Cl.⁵ ........................ B60J 10/00; F16J 15/00
[52] U.S. Cl. ................................... 296/216; 296/218; 49/488; 49/489; 49/498
[58] Field of Search ............... 296/214, 216, 218, 220, 296/221, 222; 49/488, 493, 498, 280, 289; 277/226, 229, 230, 235 R

[56] References Cited

U.S. PATENT DOCUMENTS

| 4,312,534 | 1/1982 | Jardin et al. | 296/216 |
| 4,477,507 | 10/1984 | Kunert | 49/498 X |
| 4,509,791 | 4/1985 | Bienert et al. | 296/216 |
| 4,628,639 | 12/1986 | Lownsdale | 49/498 |
| 4,667,966 | 5/1987 | Oehrle et al. | 296/216 X |
| 4,676,493 | 6/1987 | Helbig | 296/216 |
| 4,738,482 | 4/1988 | Böhm et al. | 296/216 |
| 4,765,676 | 8/1988 | Grimm et al. | 296/222 X |
| 4,783,117 | 11/1988 | Nagata | 296/216 |
| 4,925,237 | 5/1990 | Bohm et al. | 296/218 X |

FOREIGN PATENT DOCUMENTS

2137849 2/1973 Fed. Rep. of Germany ...... 296/222
3532679 11/1986 Fed. Rep. of Germany ...... 296/222
0259525 12/1985 Japan .................................. 291/218

Primary Examiner—Andres Kashnikow
Assistant Examiner—Brian L. Johnson

[57] ABSTRACT

A rigid cover assembly for a vehicle roof opening which includes a cover plate, a reinforcement frame supporting a lower peripheral edge of the cover plate, and a plastic frame surrounding the cover plate and enclosing the reinforcement frame. A sealing strip is provided on the outer peripheral edge of the plastic frame and includes a slot receiving a rib and fixing elements projecting from an outer edge of the plastic frame. A metal gap compensating element is embedded in the sealing strip outward of the plastic frame and is capable of being permanently deformed in a transverse direction. The sealing strip has a section between the metal gap compensating element and the slot and an outer edge section that is substantially more capable of deformation than the section between the metal gap compensating element and the slot.

6 Claims, 5 Drawing Sheets

RIGID COVER FOR THE ROOF OF A VEHICLE

This application is a division of application Ser. No. 269,854; filed Nov. 10, 1988, now U.S. Pat. No. 4,925,237.

The invention relates to a rigid cover for the roof of a vehicle, which in its closed position completely fills in an opening in the roof on all sides and which can be displaced by at least being partially shifted out of same, which includes a cover plate, a lower reinforcement frame supporting the cover plate along its edges, an upper edge enclosure frame up against the top side of the cover plate, and a continuous plastic frame is injection moulded around the cover plate and its reinforcement frame gripping the edge section and simultaneously forming the upper edge enclosure frame with fixing elements attached to its outer circumference for a section to seal off the clearance along the edge.

The designation "vehicle proof" is intended to cover all conventional designs which are referred to as sliding roofs, lifting roofs (so-called ventilating flaps), sliding-lifting roofs and top ridge sliding roofs depending on the displacement characteristics of the rigid cover assigned to the roof opening. It is normal practice to use both transluscent plastics or glass as well as steel sheets as the material for such roofs, whereas the reinforcement frame to which the elements necessary to manipulate and guide the rigid cover are attached, is usually made from pressed sheet steel.

The sealing strip for the clearance along the edge, which is usually attached around the circumference along the edge of the cover by slipping over the fittings located along the outer circumference from below or from the side, will ensure a water tight seal of the closed rigid cover. The existing variations in dimensions which occur as a result of the different size tolerances between cover and roof opening create a problem when matching the rigid cover, particularly when it concerns a glass cover, with the roof opening of the vehicle. The roof opening is cut out when manufacturing the roof shell of the vehicle, nd the side edges which support the reinforcement of the roof opening are folded over downwards. This will as a result produce dimensional tolerances of the roof opening which for the most part will remain constant, whereas the rigid cover consists of several sections, so that its manufacturing tolerances are greater. In the case of glass covers, since the reinforcement frame is attached to the glass cover plate, it is possible that the tolerances may be exceeded to an extent which cannot be compensated for even by an elastic sealing strip along the edge clearance. There is no guarantee any more that the contact surface of the sealing strip along the edge clearance will seat flush around the circumference on the contact surface of the roof opening without any clearance when such tolerances are exceeded. Of course the conventionally available closed slotted section of the sealing strip of the edge of the clearance will smooth out any slight unevenness because of its deformability, however, the pressure of the seal ceases to be uniformly distributed over the entire contact surface. This can on the one hand lead to local leaks and will on the other hand produce an unsightly sealing section of the sealing lining of the edge clearance when viewed from above the cover, because of the irregular shape of the contour.

Furthermore, the increased compression of the slotted strip at certain points over the sealing sections of the sealing strip of the edge clearance projecting locally beyond the surface of the roof may lead to wind noise during driving. It will not be possible any more to achieve sufficient seals for the cover if the tolerances of the rigid cover compared to the roof opening are nevertheless so wide that the deformation capacity of the slotted section of the sealing strip of the edge clearance has been negated. The fully completed cover should then be considered as a reject.

The cover plate and reinforcement frame of a known rigid cover (DE-OS 35 06 009) of the type described above are enveloped by a continuous injection moulded plastic frame simultaneously forming the upper edge enclosure frame of which there are fixing elements moulded onto the outer circumference for the sealing strip of the edge clearance. Apart from other advantages achieved, this development of the rigid cover has made it possible to narrow down the manufacturing tolerances of the cover considerably. However, even for a very dimensionally stable production of the rigid cover as regards the external dimensions, it will not be possible to exclude the likelihood of the deformation capacity of the closed slotted edge section of the sealing strip of the edge clearance being negated when compensating for the dimensional tolerances. Furthermore, it will be possible for local unevenness to exist at the areas of the cover and the opening of the roof acting jointly in producing the seal, which will lead to an uneven pressure on the sealing strip of the edge clearance. Such local unevenness cannot be compensated for either by any dimensional stability in the manufacture of the rigid cover.

The provision is made in a known solution proposal (DE-PS 34 42 653) for compensating the tolerance when sealing off the gap between the rigid sliding roof and the solid area of the roof of a motor vehicle surrounding it, where the slotted seal secured onto a bar fitted on the roof side under the fixed area of the roof is provided with a bulge on the face of the bar, which is only locally supported on the face. This is achieved by elevations projecting from the face where the gap between them is selected such that only the slot of the slotted seal is reduced when normal variations in dimensions occur. On the other hand, the seal will be pushed back in the area of the bulge in gaps extending between the elevations, when the deformation capacity of the slot is negated when extreme tolerances occur.

However, this known seal does not produce any solution to the tolerance problem for the case where the rigid cover is undersized compared with the roof opening. This known seal does not produce any proposal for the shape of the seal when the sealing strip of the edge clearance, as in the case of the type referred to above, has to be fixed to the rigid cover.

The object of the invention is to provide a rigid cover of the type referred to above, which while maintaining the inherent advantages of this type will also ensure that the sealing surface of the sealing strip of the edge clearance on the edge of the roof opening will seat uniformly in its closed position when the sealing strip of the edge clearance does not produce any continuous sealed contact surface at the edge of the roof opening because of manufacturing tolerances on the cover and/or on the roof opening.

The problem posed is solved by the invention in that a gap compensating element made from metal running around the circumference in the plastic frame is embedded by injection moulding with its inner edge area facing the cover plate, which can be permanently deformed in its transverse direction in a deformation zone by an increase in the dimension, of which the outer edge area projects from the plastic frame and a shape along the outer edge will form the fixing elements for the sealing strip of the edge clearance.

The gap compensating element provided according to the invention makes it possible to correct the relative position of the sealing strip of the edge clearance with respect to the plastic frame of the cover plate subsequently in a simple manner, where the gap compensating element will be permanently deformed in the position where there is insufficient surface contact of the sealing strip edge clearance on the edge of the roof opening by the appropriate deformation within the deformation zone. Expressed in general terms, the invention makes it possible for the outer contour of the sealing strip of the edge clearance to be subsequently corrected after it has been fitted onto the cover plate. As a result of this facility, it will also be possible to compensate for considerable existing deviations in tolerance as regards undersize of the finished cover in a manner that is simple and does not impair the effectiveness. The facility of being able to partially effect permanent deformation of the gap compensating element necessary in order to compensate for the tolerance, so that the local deviations from a close fit of the sealing strip of the edge clearance along the assigned edge of the roof opening can be compensated, will in this case be particularly advantageous. It will be possible to achieve plastic deformations in the deformation zone of the gap compensating element in a simple manner like the suitable application of force on the deformation zone, where the force is applied more or less perpendicularly to the cover surface.

The development o the rigid cover in accordance with the invention will result in it being possible to check that the fit and the position of the sealing strip of the edge clearance is in accordance with the specifications immediately after the cover has been manufactured and to correct the sealing surface. In this way, it can be guaranteed that the cover which is manufactured in large quantities can be made available with uniform external dimensional tolerances at the vehicle roof assembly in the car plant. Uniform dimensional stability is of particular importance because vehicle roofs are supplied as complete, ready to assemble units by supply companies to the production lines of motor manufacturers, where they are fitted in the bodywork already provided with the roof opening. The rigid covers are fitted as the last manufacturing process on the bodywork, after the function elements of the vehicle have already been fitted beforehand. The roof opening has relatively low tolerances as a result of the production process, because they consist of few individual components and are continuously being manufactured with the same equipment. However, the rigid cover consists of several separate components and is for the most part manufactured by hand, which will result in large production tolerances. Constant dimensional stability of the rigid cover according to the invention can be achieved by inserting the cover into a gauge, e.g. into a light box. This gauge shows the reference dimensions accurately as indicated by the associated roof cutout. It will be possible to determine the dimensional deviations on the cover immediately by the more or less wide light gap which becomes visible when the cover is inserted and from the light box illuminated from below. The outer contour of the seal can now be corrected by local application of force on the deformation zone of the gap compensating element, so as to eliminate any light gap around the cover in the gauge, or that there is a circumferential narrow light gap of constant width visible, which shines through the cloudiness when there is a cloudiness along the sealing surface of the sealing strip of the edge clearance.

The cover will in this way produce a very accurate and in the clearance along the edge, watertight fit when it is assembled. Naturally, it is not only possible to inspect the subsequent deformation adjustment of the cover according to the invention by the above-mentioned light gap test method but other methods may also be employed. For example, it will be possible to fit pressure sensors on opposite walls of the edge of the cover on gauges corresponding to the roof cutout, which will transmit the measured result onto hydraulically actuated rams which will readjust the gap compensating element at the points where the dimensions do not comply by the application of force.

There are essentially three forms of designs for the development of the edge area of the rigid cover following the philosophy of the invention. The deformation zone is located inside the plastic frame in a first form of the design, whereas the deformation zone is located in the outer edge area outside of the plastic frame in a second form of the design. A third subsidiary form of the design is described in greater detail below. All three possible designs will allow the advantageous subsequent adjustment of the seal as described.

The gap compensating element is preferably a sectional sheet produced by folding, where the outer edge area projecting out of the plastic frame is aligned more or less horizontally and consists of at least two laminas, one on top of the other, which can be shifted relative to each other when the deformation zone is deformed. Such a sheet section can be made light and true to size. A sliding layer will be produced by placing at least two laminas one on top of the other, which will ensure that the horizontal position of the external edge area will be retained when the effect on the deformation zone causes the permanent deformation.

In practice the arrangement is made such that fixing elements for the sealing strip of the edge clearance directed approximately vertically upwards and downwards are attached to the horizontally aligned outer edge area of the gap compensating elements. The alignment of the fixing elements for the sealing strip of the edge clearance will be retained after the plastic deformation of the deformation zone because of the above-mentioned sliding layer.

It is provided in a further development of the invention that a plate wall joined directly to at least one of the fixing elements in the deformation zone of the clearance compensating element forming an enclosed slot which is bent downwards and can be permanently deformed in the deflected area as a result of the effect of the force directed onto the enclosed slot. In this way, it will be guaranteed that the force application correcting the sealing layer shall in each case act from the cover side outwards, which in the position where it is used, forms the underside. The permanent deformations of the deformation zone insofar as they are at all noticeable are therefore not visible from the outside. Provision is made in an advantageous development of the above-mentioned first form of the design of the invention where the enclosed slot formed in the deformation zone is bounded at the top by an undeformable plate wall embedded in the plastic frame, which with a horizontal guide section projects out of the plastic frame, where the deflected deformable sheet wall bounding the slot at the bottom also projects out of the plastic frame with the horizontal wall section, which horizontal wall section in forming the fixing elements, has its outer edge in the first instance bent slightly downwards in the vertical plane, then slightly upwards in the vertical plane and again slightly downwards in the vertical plane and finally curved into a horizontal flange aligned with the slot, which is located between the guide section and the horizontal wall section and together forms the outer edge area of the gap compensating element, and where the deflected sheet wall is covered on the outside by a comparatively thin plastic layer, through which it will be possible to transmit the effect of the deformation forces acting on the sheet wall and which together with the sheet wall can be deformed. The outward projection of the gap compensating element in this development of the invention is practically not visible as soon as the sealing strip of the edge clearance is anchored onto its fixing element. Nevertheless, this development of the invention will allow the effect of a deformation force to be transmitted to the deformation zone.

The arrangement in a beneficial development of the above-mentioned second form of the design of the invention is such that the enclosed slot formed in the deformation zone is bounded at the top by an undeformable sheet wall projecting horizontally out of the plastic frame and essentially forming the outer edge area of the gap compensating element, where the deflected deformable sheet wall bounding the underside of the enclosed slot also projects out of the plastic frame, and where in forming the fixing elements, the horizontally projecting sheet wall has its outer edge first bent approximately vertically upwards and then approximately vertically downwards, whereas the outer edge of the deflected sheet wall correspondingly is in the first instance bent approximately vertically downwards and then approximately vertically upwards, whereby finally the curve of the horizontally projecting sheet wall that is directed downwards and the curve of the deflected sheet wall directed upwards form a common outer approximately vertical sheet wall before any deformation. Because of this very simple design of the sheet section forming the gap compensating element, the sealing strip of the edge clearance will not experience practically any parallel outward displacement when the deformation zone is deformed, as is the case with the beneficial development of the first form of the design sketched out above, but will perform a kind of tilting or swivelling movement. Consequently, no gap resulting from the permanent deformation will in this case be created between the upper edge enclosure frame and the sealing strip of the edge clearance.

A particularly gentle deformability of the deformation zone of the gap compensating element will be achieved when the deflected sheet wall is made with two wall sections directed downwards obliquely, so as to subtend a right or obtuse angle between them.

In the first form of the design of the cover according to the invention, it will be beneficial if an edge step is formed in the top surface of the plastic frame, which will form a fit that can slide in the transverse direction with a corresponding projection of the sealing strip of the edge clearance for matching to the increases in the dimension because of the deformations in the deformation zone.

On the other hand, the arrangement is effectively made in the second design form of the invention such that the plastic frame and the sealing strip of the edge clearance with rounded edges lie one on top of the other to form a butt joint. The tilting and swivelling motions which occur in the permanent deformation of the deformation zone described will be favoured as a result.

Provision is made in an extension of the philosophy of the invention where the plastic frame is reinforced by the gap compensating element embedded in it along its circumference in the form of a frame in addition to the reinforcement produced by the reinforcement frame, and that the reinforcement frame is divided into four separate strip sections embedded in the plastic frame. This development makes use of the stiffening or reinforcing effect on the whole cover of the gap compensating element with its inner edge section embedded in the plastic frame, with the result that the reinforcement frame does not any more have to stiffen or reinforce the edge section of the cover plate by itself. The reinforcement frame can therefore be of a weaker design and in particular it will not have to be of a frame structure made from a single part anymore, which for example is pressed out of a steel sheet. It will therefore suffice for four separate profile sections to be embedded in the plastic frame along the four sides of the cover, where it will not be necessary for the adjacent ends to be up against each other or even have to be joined together at the ends to form a enclosed frame. The necessary corner reinforcement will in this case be taken over in the main by the frame shape surrounding gap copensation strip in conjunction with the plastic embedding all the edge sections of the cover. In this way, it will be possible to provide simple rolled sections or extruded sections as reinforcement, where the front, rear and side shapes may be designed differently according to the different requirements. Both sections and sheet steel as well as those from a suitable light metal can be considered.

In the two design examples described above, the gap compensating element is at the same time intended to fix the sealing strip of the edge clearance, which should be considered in the development of the gap compensating element by providing it with a suitable shape. On the other hand, a simpler development of the gap compensating element is made possible in a third subsidiary form of the design in that a gap compensating element made of metal is attached around the outer circumference of the cover, which can be permanently deformed in a perpendicular direction in a deformation zone while increasing the dimension and is completely moulded into the sealing strip of the edge clearance, which is developed so as to be less deformable between the gap compensating element and the fixing elements of the plastic frame securing the latter than in its outer edge area.

It will not be necessary to take any measures whatsoever to fix the sealing strip of the edge clearance to the edge compensating element, because of the gap compensating element being formed in the sealing strip of the edge clearance which completely surrounds the latter, so that the gap compensating element can be given a very simple and easy to manufacture shape. The direction of the deformation experienced by the sealing strip of the edge clearance during the plastic deformation of the embedded gap compensating element will be specified because of the different ways in which the sealing strip of the edge clearance can deform as has been indicated.

The gap compensating element can in this case be beneficially constructed from a metallic angle section of which one flange is directed upwards and outwards at an angle with respect to the cover plate, and of which the other flange is directed downwards and outwards, so that the apex area of the metallic angle section will form the deformation zone. A very efficient gap compensating element is obtained by this simple manner, of which the effect of the gap compensation is based on the fact that the flanges of the metallic angle sections subtend a larger or smaller apex angle. The gap compensating element is preferably located between an inner fixing slot and a cavity enclosed on the outer edge of the sealing strip of the edge clearance in the conventional manner, where both flanges enclose the cavity extending almost into the apex area of the metallic angle section. A considerable deformability of the sealing section of the edge clearance in terms of its increase in width will be achieved by this arrangement. This arrangement of the gap compensating element in the sealing strip of the edge clearance will also make it possible to house the gap compensating element in the sealing strip of the edge clearance in an unobtrusive and space saving manner.

The flanges of the metallic angle sections will effectively subtend an obtuse angle in the undeformed condition.

The deformability of the sealing section of the edge gap will be improved with the plastic deformation of the metallic angle sections when the two flanges of the metallic angle section subtend an acute angle with adjacent boundary wall areas of the cavity to form a folded section, where the apex of the angle comes very close to the apex area of the metallic angle section. The two limbs of the metallic angle section are effectively of different lengths, so that the longer flange is directed downwards and outwards and extends into a suitably direct sealing lip of the sealing strip of the edge clearance. An internal support of the sealing lip will in this way be achieved at the same time by the gap compensating element, which will improve the sealing effect of the sealing strip of the edge clearance.

Other details of the invention will be particularly described below with reference to drawings representing design examples. Where.

Figure 1:
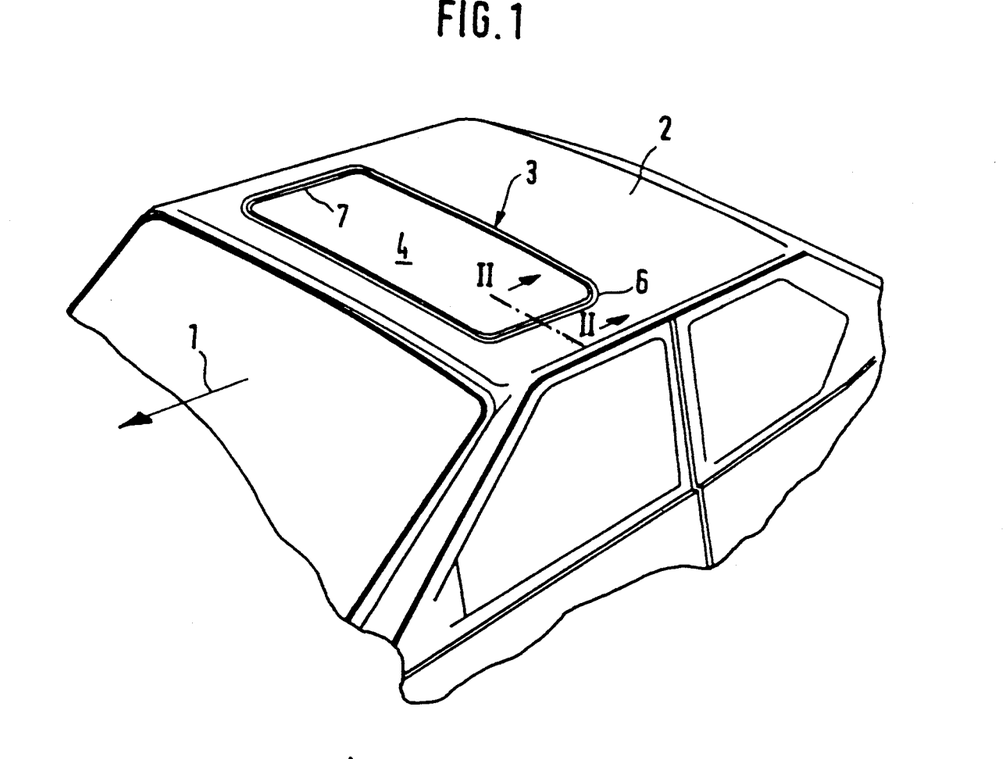
FIG. 1 is a partial perspective view of a roof of a vehicle with a rigid cover in the closed position.
Figure 6:
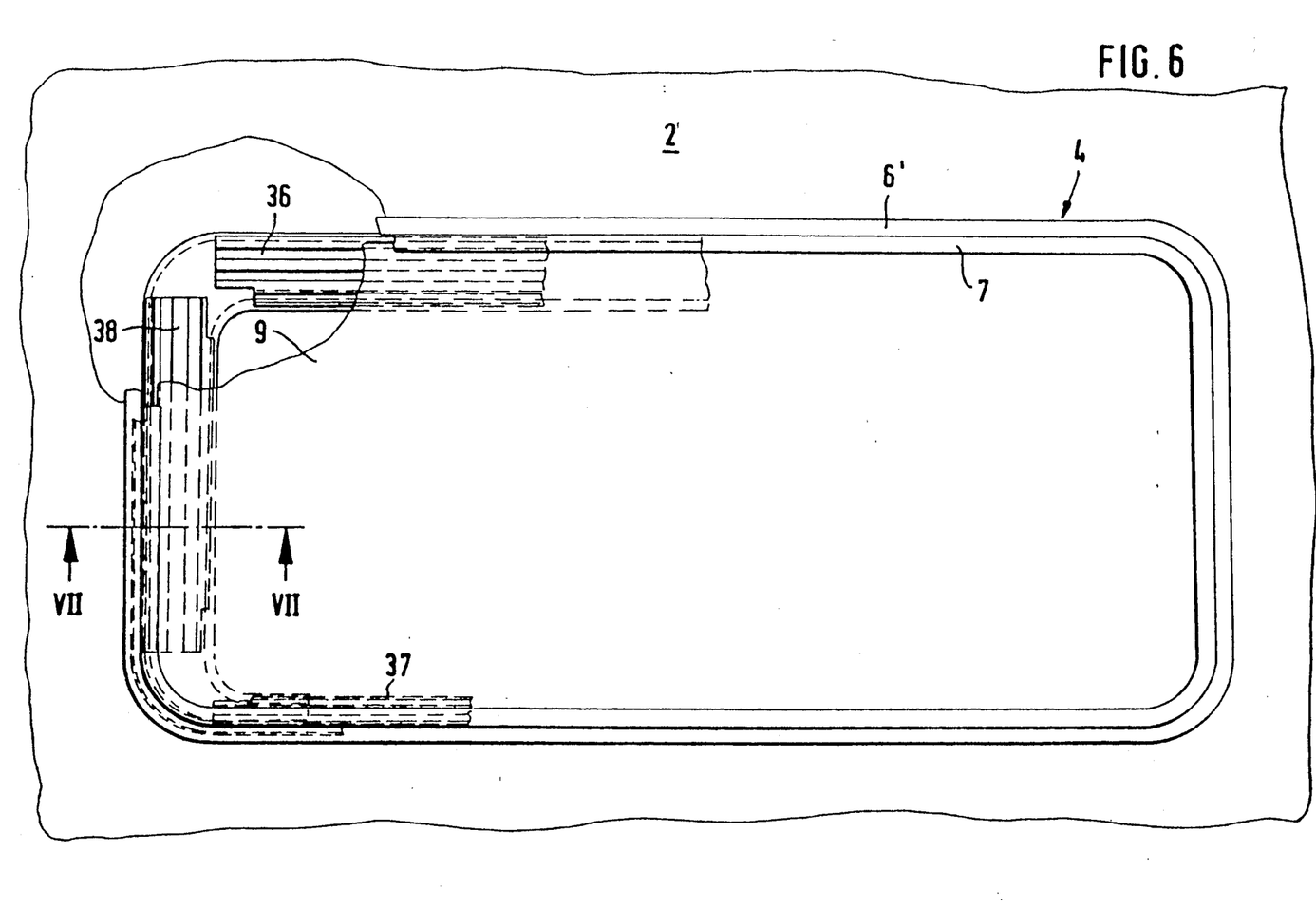
FIG. 6 is a plan view partially broken away of a vehicle roof with closed glass cover and a reinforcement frame consisting of four parts.
Figure 7:
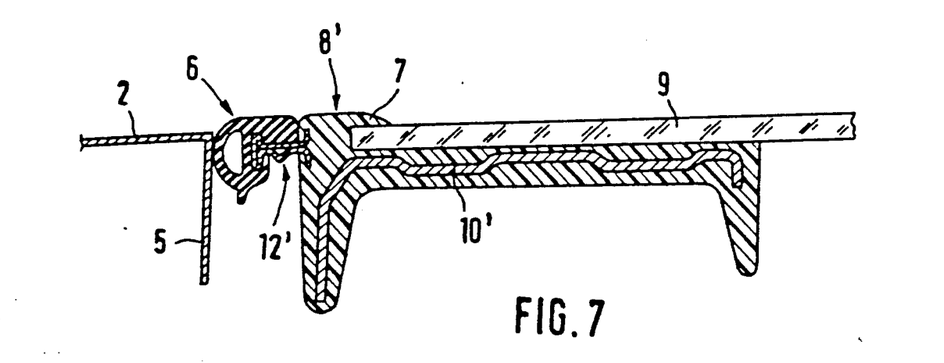
FIG. 7 is a partial sectional view taken along line VII—VII in FIG. 6 of one of the second forms of the design essentially corresponding to the development of the edge of the cover.

The drawings show the design examples of the rigid cover essentially schematically, with the representations of the sections according to FIGS. 2-5 and 8, 9 enlarged compared to reality. The sections of the vehicle roof bordering the roof opening have not been shown for simplicity in FIGS. 2-5 and 8, 9. The arrangement shown in FIG. 6 may also be used in conjunction with the first form of the design of the rigid cover shown in FIGS. 2 and 3. The design examples in accordance with FIGS. 1 to 7 will be considered in the first instance. The vehicle roof shown in FIG. 1 belongs to a car, of which the direction of forward travel is indicated by the direction of travel arrow 1. As regards the front section with respect to the forward direction of travel of a fixed roof area 2 of the vehicle roof, there is a roof opening 3 which contains a rigid cover 4 shown in the closed position. The cover 4 is sealed off against a perpendicular fold 5 of the fixed roof surface, as best shown by FIG. 7, by a sealing strip of the edge clearance 6. FIG. 1 also shows an upper enclosing edge frame 7 forming an integral component of a plastic frame 8 still to be described in greater detail.

There is a cover plate 9 made from glass or a translucent plastic enclosed by a one piece unitary plastic frame 8 in all the design examples. There is a reinforcement frame 10 formed from sheet steel under the cover plate 9 supporting the cover plate along its edge section from below in the forms of the design shown in FIGS. 2-5, which has external dimensions approximately corresponding to those of the cover plate 9. On the other hand, in the design example according to FIGS. 6 and 7, the slightly differently developed reinforcement frame 10 projects beyond the edge of the cover plate 9. The operating and guide elements (not shown) of the vehicle roof are attached to the reinforcement frame 10 or 10'. The cover plates 9 in all the design examples have their edge sections and reinforcement frame 10 made from one piece or reinforcement frame 10' made from four pieces (FIG. 6,7) solidly embedded in the plastic frame 8 or 8' fitted by injection moulding this component. The plastic frame 8 or 8' forms the upper edge enclosure frame 7 visible from the top on the outside which partially overlaps the cover plate 9. The reinforcement frame 10 or 10, is completely embedded in the plastic frame 8 or 8' under the cover plate 9.

Figure 2:
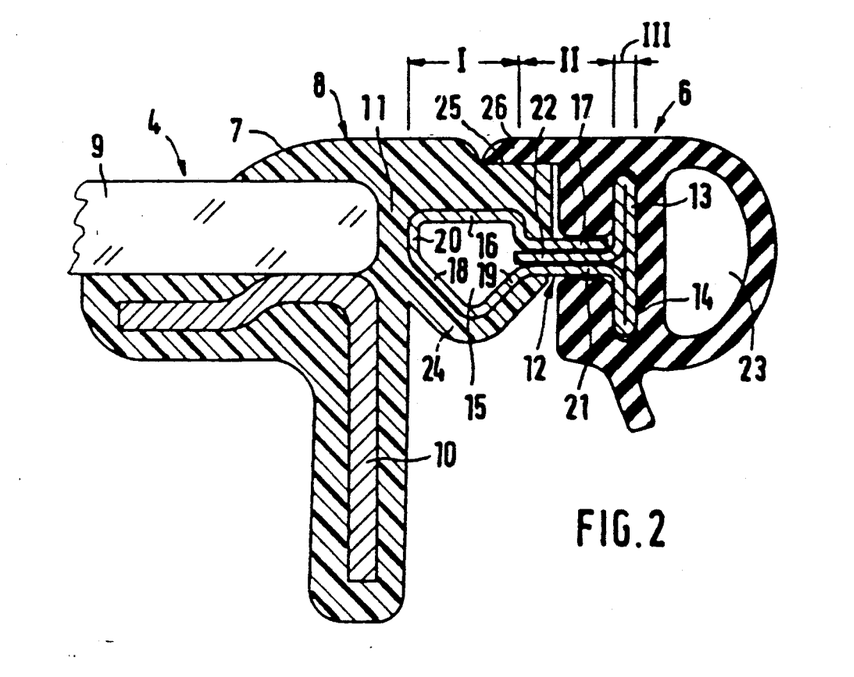
FIG. 2 is a partial sectional view along line II—II of FIG. 1 through a first form of the design of a roof of a vehicle with glass cover having a gap compensating element not yet deformed.
Figure 3:
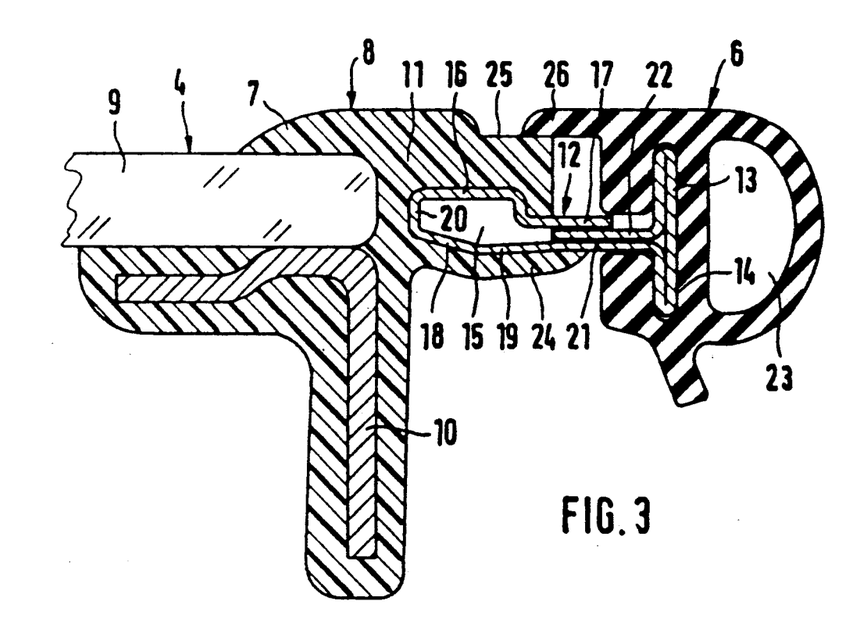
FIG. 3 is a section corresponding to FIG. 2, however, with the gap compensating element deformed.

The development of the cover according to the invention will now be particularly explained with reference to the first design form shown in FIGS. 2 and 3. As is evident from the figures, there is a gap compensating element generally given the reference number 12 embedded in a reinforcement 11 of the plastic frame 8 of the edge section surrounding the edge of the cover plate 9 by injection moulding. The outer edge section of the gap compensating element 12 projects out of the reinforcement 11 of the plastic frame 8 and is made with fixing elements 13 and 14 on its outer side for attaching the sealing strip 6 of the edge clearance. The gap compensating element 12 is a folded sheet steel section which is divided into three sections I, II and III on the basis of its function. Section I forms the deformation zone, which makes a permanent increase in dimension of the gap compensating element outwards possible. Section II forms a sliding layer for a guided horizontal movement when there is a force acting on the gap compensating element in the deformation zone to produce an increase in dimension. Finally, Section III which contains the fixing elements 13 and 14 is intended to accommodate the sealing strip of the edge clearance. As is made clear in FIGS. 2 and 3, the deformation zone defined by Section I is located entirely within the reinforcement 11 of the plastic frame 8, whereas the sliding layer according to Section II is still only partially inside the reinforcement 11. The sliding layer which for the greater part of its length is outside the reinforcement of the outer edge section of the gap compensating element 12 is aligned horizontally and is formed from three laminas placed one on top of the other in a manner yet to be described, which can be partially shifted towards each other when there is an increase in the dimension of the gap compensating element. The fixing elements 13 and 14 will remain in their approximately vertical alignment as shown in FIGS. 2 and 3 when there is an increase in dimension.

The deformation zone next to the edge of the cover plate 9 as shown in Section II contains an enclosed slot 15 which is bounded at the top by an undeformable sheet wall 16 embedded in the plastic frame 8. A guide section 17 projecting horizontally outwards from the plastic frame 8 which forms the upper of the three laminas referred to and which is the section of the sliding layer remaining rigid when there is an increase in dimension, is joined to the sheet wall 16 after being bent twice at right angles. At the bottom the enclosed slot 15 is formed by a sheet wall deflected downwards, which has two wall sections 18 and 19 directed downwards at an angle, between them subtending a right angle. The upper sheet wall 16 and the sheet wall 18 deflected downwards are joined on the side facing the cover plate by a vertical wall section 20. A wall section 21 bent into the horizontal position and projecting out of the plastic frame 8 is separated from the horizontal guide section 17 and aligned in a parallel plane by a distance approximately equal to a sheet thickness and is displaced outwards with respect to the horizontal guide section when there is an increase in dimension, is joined to the wall section 19.

The outer edge of the horizontal wall section 21 is first bent approximately vertically downwards at its outer edge to form the two fixing elements 13 and 14, then approximately vertically upwards, and then approximately vertically downwards and finally towards the horizonal as a flange 22 aligned with the enclosed slot 15 and located between the horizontal guide sections 17 and the horizontal wall section 21. The guide section 17, the flange 22 and the wall section 21 together with the fixing elements 13 and 14 form the outer edge section of the gap compensating element 12 and have an approximately T-shaped cross-section. The sealing strip 6 of the edge clearance has an engagement slot corresponding to the outer edge section, so that the sealing strip of the outer edge clearance 6 can form a tight fit with the outer edge of the gap compensating element 12 projecting out of the reinforcement 11 of the plastic frame 8. There is a cavity 23 inside the sealing strip of the edge clearance 6 which facilitates its elastic deformation.

As is evident from the drawings, the lower deflected sheet wall 18, 19 is only covered on the outside by a plastic layer 24 which is thin compared to the other dimensions of the reinforcement 11, which can be used to transmit the applied deformation forces onto the sheet wall 18, 19, and which participate in the deformation movement of the sheet wall. A circumferential edge step 25 is formed in the upper surface of the plastic frame 8, which seats the corresponding projection 26 of the sealing strip of the edge clearance 6. The height of the edge step 15 corresponds to the thickness of the projection 26, so that the top surfaces of the plastic frame 8 and of the sealing strip of the edge clearance 6 are approximately in the same plane. The sealing strip of the edge clearance 6 as a shaped strip can be stuck onto the outer edge section of the gap compensating element 12 such that the ends touch without leaving a gap, however, it will also be possible to be developed with the ends welded together as an enclosed ring.

In the example shown according to FIGS. 2 and 3, the reinforcement frame 10 is developed into an angle section bent downwards like the section of its upper flange, with the cover plate 9 supported on the unbent upper flange section and which is otherwise embedded in the plastic frame 8 on all sides by plastic injection moulding, which also has the approximate shape of an angle section beneath the cover plate 9. It is not necessary to describe the injection moulding tools for injection moulding the cover plate 9, the reinforcement frame 10 and the gap compensating element 12 in greater detail, because such injection moulding tools are in accordance with the latest state of engineering. Naturally, the components to be injection moulded are placed in the injection moulding tool in accurately defined positions with respect to each other and to the adjacent surfaces of the injection moulding tool.

A force will be applied from the underside of the cover against the fixed support surface of the top side of the cover at the position of the gap compensating element 12, which corresponds approximately to the apex of the angle between the wall sections 18 and 19 forming the lower boundary sheet wall of the enclosed slot 15, if a correction is necessary because of the size of the gap of the edge clearance seal as a result of dimensional inaccuracies between the rigid cover 4 and the roof opening 3. The action of the force will then be approximately at right angles to the cover surface. The components located in the edge section of the rigid cover 4 will adopt the approximate positions shown in FIG. 2 before the application of the force starts to take effect. The angle between the wall sections 18 and 19 will be increased as a result of the application of the force while at the same time reducing the deflection angle between the vertical wall section 20 and the wall area 18 as well as increasing the angle between the wall area 19 and the wall section 21 at the same time. These deformations of the gap compensating element 12 will essentially take place in the plastic area, i.e. will lead to a permanent increase in dimension. The enclosed slot 15 will be reduced as a result, as is evident when comparing FIGS. 2 and 3. Wall section 21 together with the fixing elements 13 and 14 moulded onto same as well as the horizontal flange 22 will be shifted horizontally outwards as a result of the changes in angle described. Accordingly, the sealing strip of the edge clearance 6 will also be displaced outwards, so that its projection 26 will slide along the edge step 25.

As is made clear in FIG. 3, it will be possible to achieve a considerable increase in dimension in the first form of the design according to the invention as a result of the sliding displacement of the sealing strip 6 of the edge clearance. Depending on whether the force is only applied locally or over a longer circumferential section of the cover 4, the deformation area will correspondingly be limited or more extended.

Figure 4:
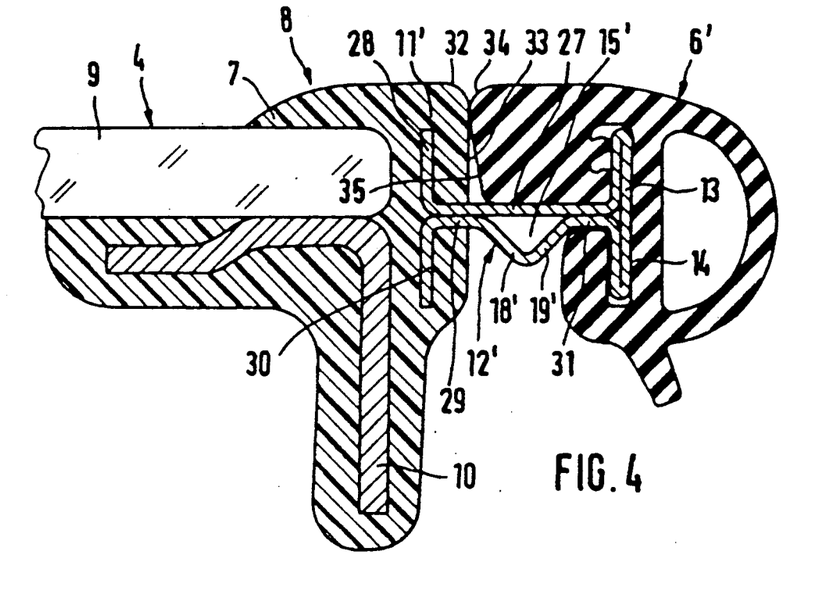
FIG. 4 is another partial sectional view corresponding to the section II—II in FIG. 1 through a second form of the design of a vehicle roof with glass cover having a gap compensating element not yet deformed.
Figure 5:
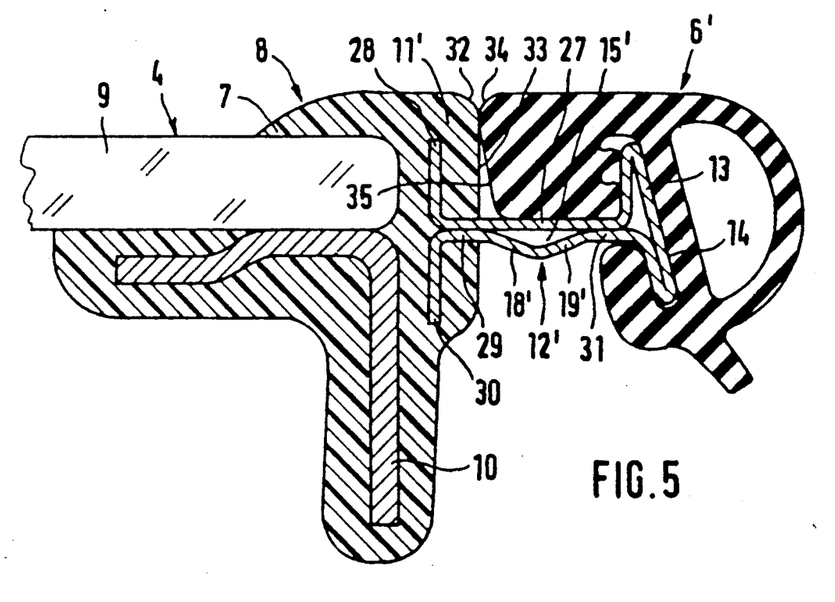
FIG. 5 is a section corresponding to FIG. 4, however, with the gap compensating element deformed.

Reference is now made to FIGS. 4 and 5 for further explanation of the second form of the design according to the invention.

This form of design differs from the first form of the design essentially in that the deformation zone of the gap compensating element 12' is located on the outer edge section of same outside of the plastic frame 8. The gap compensating element 12' will in this case have a cross-section with the approximate shape of a double T before any deformation (FIG. 4). The sealing strip of the edge clearance 6' differing from the first design form in a manner still to be described in detail, is again in the first instance attached to approximately vertically aligned fixing elements 13 and 14 before any deformation. The enclosed slot 15' located in the deformation zone is provided outside the plastic frame 8 and is bounded at the top by an undeformable sheet wall 27 embedded in the plastic frame 8, which forms a horizontal guide section projecting from the plastic frame 8 remaining in an unchanged position during the deformation. The enclosed slot 15' is again bounded at the bottom by a deformable sheet wall deflected downwards, which consists of the wall sections 18' and 19,, which in the example shown also subtend an approximately right angle before any deformation. The sheet wall 27 terminates in a considerably smaller thicker section 11' compared to the first form of the design with an edge 28 turned approximately vertically upwards. A horizontal wall section 29 up against the sheet wall 27 projecting from the thickened section 11' of the plastic frame 8 joins onto the wall section 18,, which internally terminates into an edge 30 corresponding to the edge 28, but bent downwards. Two bent edges 28 and 30 will provide a secure anchoring for the gap compensating element 12' in the plastic frame 8 during the injection moulding process.

As is also evident from FIG. 4, the outer edge of the sheet wall 27 is first bent approximately vertically upwards and then approximately vertically downwards to form the two fixing elements 13 and 14. The sheet wall bent over downwards to form the enclosed slot 15' has a horizontal outwardly aligned wall section 31 up against the sheet wall 27 joining onto the wall section 19', which is in the first instance bent approximately vertically downwards and then approximately vertically upwards. The curve of the sheet wall 27 directed downwards and the curve of the wall section 31 directed upwards in this case form a common outer approximately vertical sheet wall before any deformation. As is evident, the gap compensating element 12' can also be constructed from a single sheet strip by bending and folding in this form of the design as well.

Apart from its area with thicker section 11', the second form of the design of the plastic frame 8 has also been developed in accordance with the form of the design as described with reference to FIGS. 2 and 3. This also applies to the shape and embedding of the reinforcement frame 10. The upper surface of the enclosure frame 7 with a round edge 32 transforms into an approximately vertically aligned edge surface 33. The upper surface of the sealing strip of the edge clearance 6' is located approximately in the same plane as the upper surface of the plastic frame 8 and transforms into a surface 35 directed downwards with correspondingly rounded off edge 34 and subtends an acute angle with the edge surface 33. As is evident, the rounded off edges 32 and 34 subtend an obtuse angle with pretensioning, which is achieved by the corresponding design of the sealing strips of the edge clearance 6' and which ensures that the gap between the plastic frame 8 and the sealing strip of the edge clearance 6' is sealed off.

A force directed approximately vertically is applied to the apex of the two wall sections 18' and 19' from the underside of the cover against a fixed support of the top side of the cover in order to correct the size of the gap at the edge clearance seal because of deviations in the dimensions between the cover and the roof opening, so that by reducing the enclosed cavity 15' the angle between the wall section 29 and the wall section 18' and the angle between the wall sections 18' and 19' and the wall section 31 will in each case be increased. Wall section 31 will in this case be shifted outwards on the sheet wall 27' so that the fixing elements 13 and 14 will be displaced from their approximately vertical alignment as shown in FIG. 4 into an oblique position as is shown in FIG. 5. The sealing strip of the edge clearance 6' will be taken along outwards in the manner of a twist and tilting movement in the sense of an increase in dimensions because of the close fit between the fixing elements 13, 14 and the sealing strip of the edge clearance 6'. The rounded edge 34 of the sealing strip of the edge clearance 6' will be supported more and more on the rounded edge 32 or the edge surface 33 of the plastic frame 8, which is still supported by the bulge of the allocated section of the accommodating channel in the sealing strip of the edge clearance in the area of the fixing element 13. It will naturally also be possible in this second form of the design for the effect of the force on the gap compensating element 12' with the results described either to be applied with local restrictions or applied over a larger section of the circumference of the cover. As wider gap will be produced between the enclosure frame 7 and the sealing strip of the edge clearance 6 in the form of the design according to FIG. 3 when the corresponding gap compensating element in each case is subject to plastic deformation, which will make the edge step 25 more or less visible, whereas in the form of the design according to FIG. 5 the groove between the rounded edges 32 and 34 are more likely to become smaller.

The frame will be considerably reinforced by embedding a gap compensating element 12 or 12' in the form of a folded sheet section form with the plastic frame 8 being attached by injection moulding, so that in contrast to the two design examples described to now, it will not be necessary to make the reinforcement frame 10 from one piece. FIG. 6 shows the split up of the reinforcement frame into four separate strip sections which are not joined at the ends. For simplicity FIG. 6 shows the front strip section 36, the rear strip section 37 and the side strip section 38, which corresponds to a strip section on the other side not shown. The strip sections 36, 37 and 38 may have different profiles and in each case a profile suitable to the application and need not consist of chamfered or pressed laminas. On the contrary, they may also be cut out of extruded alluninium sections. By embedding the strip sections 36 and 38 by attaching the plastic frame 8' by injection moulding, the strip sections will be indirectly joined via the injection moulded plastic, so that a quite adequate cover reinforcement will also be produced in the corner area of the rigid cover 4. It will be possible to use separate strip sections on the one hand by injection moulding a plastic frame 8' and on the other hand by embedding the circumferentially arranged gap compensating element which promotes stability.

Figure 8:
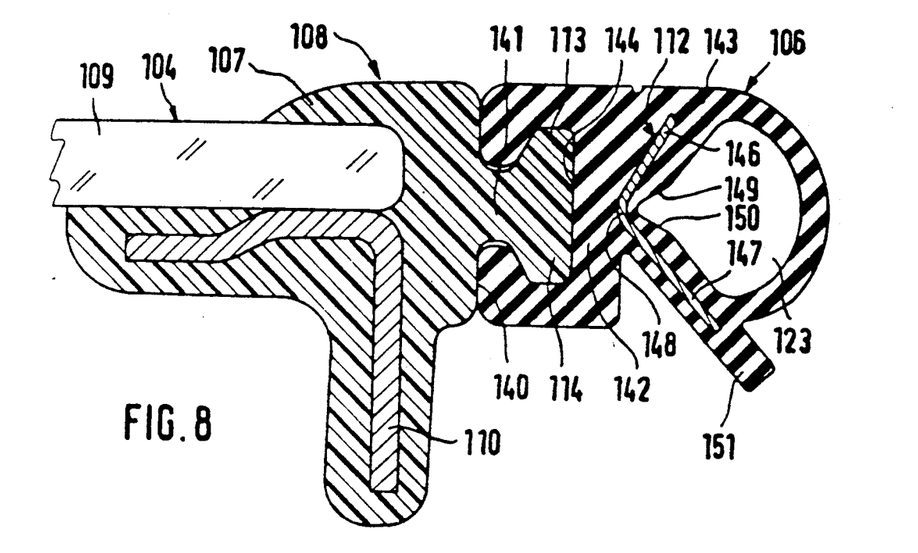
FIG. 8 is a partial sectional view through the edge area of a rigid cover showing a third form of the design with fitted sealing strips of the edge clearance fitted and the gap compensating element not yet deformed to compensate for the tolerance.
Figure 9:
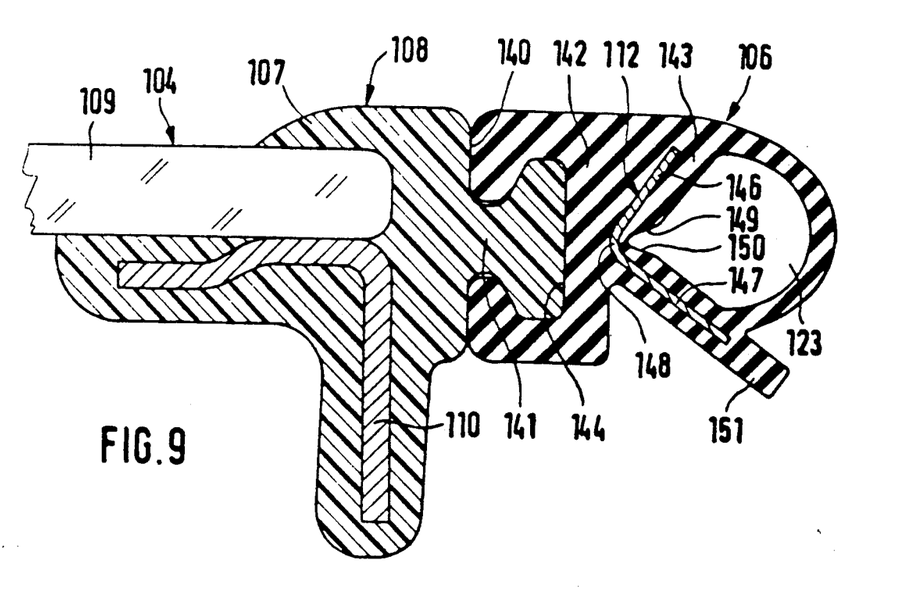
FIG. 9 is a section corresponding to FIG. 8, however, with deformed gap compensating element and correspondingly deformed edge gap seal.

The third form of the design will now be explained with reference to FIGS. 8 and 9.

The drawing which has been enlarged compared to the actual dimensions of the component shows a broken off rigid cover 104 of which the cover plate 109 made from glass or a transluscent plastic is supported at the edge area by a reinforcement frame 110 with angular cross-section. The cover plate 109 is surrounded by an injection moulded plastic frame 108, which forms one of the upper enclosure frames 107 located on the top of the cover plate 109 and rigidly embeds the reinforcement frame 110 beneath the cover plate 109.

A center rib 141 projects out of an outer edge area 140 of the plastic frame 108, which together with fixing elements 113 and 114 projecting upwards and downwards will produce an approximately T-shaped design. Rib 141 and fixing elements 113 and 114 form the fixing elements for the sealing strip of the edge clearance 106 moulded onto the plastic frame 108.

The sealing strip of the edge clearance 106 has a section 142 which can practically not be deformed internally and an easily deformable outer section 143. A fixing slot 144 is located in the inner section 142, which has a cross-sectional shape which is approximately complementary to the shape of the cross-section of the center rib 141 with the fixing elements 113 and 114 attached to it. There is a cavity 123 in the outer area 143 which provides easy deformability of the outer area 143.

The gap compensating element 112 has the shape of, for example, a metallic angle section made from sheet steel and is rigidly embedded between the inner section 142 and the outer section 143 of the sealing strip of the edge clearance 106. As regards the cover plate 109, one flange 146 of the gap compensating element 112 extends obliquely upwards and outwards, whereas the other flange 147 is directed obliquely downwards and outwards. The apex area 148 is the deformation zone of the gap compensating element 112. The two flanges 146 and 147 to a certain extent envelop the cavity 123 which extend approximately into the apex area 148 of the metallic angle section. The flanges 146 and 147 in the initial position of the gap compensating element 112 shown in FIG. 8 subtend an obtuse angle. On the other hand, the bounding wall areas 149 and 150 of the cavity 123 adjacent to the two flanges 146 and 147 subtend an acute angle to form a folding section, where the apex approximates the apex area 148 very closely.

The two flanges 146 and 147 are of different lengths, where the flange 147 extends into a suitably aligned sealing lip 151 which it reinforces.

The apex angle between the flanges 146 and 147 of the gap compensating element 112 will be reduced, if a force acting on the gap compensating element 112 is applied approximately in the perpendicular direction onto the sealing strip of the edge clearance with the top side of the cover rigidly supported. The sealing strip of the edge clearance 106 will also be deformed because of it being rigidly embedded in the material, so that the cavity 123 will experience a compression that leads to an outward displacement of the circumferential surface of the sealing strip of the edge clearance 106. The outer contour of the rigid cover 104, which encloses the sealing strip of the edge clearance 106, can in this way be changed in the sense of an increase in dimension to compensate for manufacturing tolerances. The increase in dimension may be restricted to limited circumferential sections of the cover, if the effect on the gap compensating element 112 is only partially deforming.

We claim:

1. A rigid cover assembly for a vehicle roof opening which can be at least partly displaced out of the roof and which fills the roof opening when in a closed position comprising:

a cover plate, a reinforcement frame supporting a lower peripheral edge of the cover plate, a plastic frame circumferentially surrounding the cover plate, said plastic frame covering an upper peripheral edge of the cover plate and enclosing said reinforcement frame, a rib projecting from an outer peripheral edge of said plastic frame and including fixing elements projecting from said rib, a sealing strip provided on said outer peripheral edge of said plastic frame, said sealing strip having a fixing slot receiving said rib and fixing elements, a metal gap compensating element embedded in said sealing strip outward of said plastic frame, said metal gap compensating element being capable of being permanently deformed in a transverse direction, and said sealing strip having a section between said metal gap compensating element and said fixing slot and an outer edge section and said outer edge section is substantially more capable of deformation than said section between said metal gap compensating element and said fixing slot.

2. A cover according to claim 1, wherein said metal gap compensating element is formed from a metallic angle section having one flange directed obliquely upwards and outwards with respect to the cover plate and a second flange directed obliquely downwards and outwards, and wherein an apex area of the metallic angle section forms a deformation zone.

3. A cover according to claim 2, wherein said metal gap compensating element is located between said fixing slot and a cavity enclosed in the sealing strip at said outer edge and said cavity extends to a location closely adjacent to the apex area of the metallic angle section.

4. A cover according to claim 2, wherein the flanges of the metallic angle section subtend an obtuse angle in the undeformed condition.

5. A cover according to claim 3, wherein said cavity includes two boundary wall surfaces adjacent to said flanges of the metallic angle section and said boundary wall surfaces subtend an acute angle having an apex adjacent to the apex area of the metallic angle section to form a folding position.

6. A cover according to claim 2, wherein said second flange of the metallic angle section is longer than said one flange and extends downwards and outwards into a correspondingly aligned sealing lip of the sealing strip.

* * * * *